US007038783B2

(12) United States Patent
Standjord et al.

(10) Patent No.: US 7,038,783 B2
(45) Date of Patent: May 2, 2006

(54) EIGEN FREQUENCY DETECTOR FOR SAGNAC INTERFEROMETERS

(75) Inventors: Lee K. Standjord, Tonka Bay, MN (US); David A. Doheny, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 504 days.

(21) Appl. No.: 10/443,958

(22) Filed: May 23, 2003

(65) Prior Publication Data

US 2004/0233456 A1 Nov. 25, 2004

(51) Int. Cl.
*G01C 19/64* (2006.01)

(52) U.S. Cl. .................................................. 356/460

(58) Field of Classification Search .................... None
See application file for complete search history.

(56) References Cited

U.S. PATENT DOCUMENTS

| | | | |
|---|---|---|---|
| 5,734,469 A | | 3/1998 | Strandjord |
| 5,767,968 A | * | 6/1998 | Strandjord .................. 356/460 |
| 5,781,300 A | * | 7/1998 | Strandjord et al. .......... 356/460 |
| 5,953,123 A | * | 9/1999 | Jaklitsch et al. ............ 356/464 |
| 6,175,410 B1 | * | 1/2001 | Szafraniec et al. .......... 356/459 |

OTHER PUBLICATIONS

Hee Gap Park et al., "Stabilisation of Fibre-Amplifier/Source Gyroscope by Optimum Modulation Amplitude Tracking", Electronics Letters, Jun. 24th, 1999, vol. 35, No. 13.

* cited by examiner

*Primary Examiner*—Hwa (Andrew) Lee
(74) *Attorney, Agent, or Firm*—Kurt A. Luther

(57) ABSTRACT

A system for detecting the eigen frequency of a sensing coil in a fiber optic gyro (FOG) that includes a fiber coupler connected to the light source, an integrated optics chip (IOC) capable of modulating light received from the light source via the fiber coupler, a sensing coil in communication with the IOC, a first modulation generator for imparting a first modulation signal to the light, and a photodetector for receiving light returning from the sensing coil that is representative of a rotation rate of the sensing coil. Along with the foregoing there is provided a second modulation generator for imparting a second, preferably sinusoidal, modulation signal to the light, a high-frequency demodulator in communication with a signal produced, at least indirectly, by the photodector, and a low-frequency demodulator in communication with the high-frequency demodulator. The high-frequency demodulator receives the first modulation signal as a reference frequency and the low-frequency demodulator receives the second modulation signal as a reference frequency. An output of the low-frequency demodulator represents a magnitude and sign of a frequency difference between a frequency of the second modulation signal and an even-harmonic of the eigen frequency.

19 Claims, 5 Drawing Sheets

EIGEN FREQUENCY DETECTOR FOR SAGNAC INTERFEROMETERS

BACKGROUND

1. Field of the Invention

The present invention relates generally to Sagnac interferometers and more particularly to detecting the eigen frequency of a sensing coil of a fiber optic gyroscope.

2. Background of the Invention

The eigen frequency (sometimes called the "proper" frequency) of a fiber optic gyroscope (FOG) sensing coil is an extremely important parameter for the operation of navigation and high performance grade FOGs. The eigen frequency is essentially defined by the optical path length of the sensing coil. Many sources of rate output errors are reduced or effectively eliminated by operating the bias modulation at the eigen frequency. Generally speaking, the bias modulation must be operated to within at least a few ppm of the eigen frequency in order for FOGs to meet high performance requirements. New applications are now putting more demanding performance requirements on these types of gyros.

For navigation grade FOGs that must operate over wide temperature ranges, the current state of the art method of maintaining the bias modulation at the eigen frequency employs a method of indirectly measuring the eigen frequency. The eigen frequency is estimated from temperature measurements of the coil and calibration coefficients on a calibrated lookup table. This method has drawbacks in that it requires, among other things, extensive testing for calibration, and, since it is an indirect measurement of the eigen frequency, it has accuracy limitations.

High performance FOGs for space-based pointing and submarine navigation applications currently use temperature control of the fiber coil to maintain the eigen frequency near a constant value. The bias modulation frequency is then maintained near the eigen frequency by deriving the frequency from a temperature controlled or compensated crystal oscillator. This method works well for maintaining gyro operation at the eigen frequency for a relatively short duration of one to two years and under a relatively benign laboratory environment. However, the drift of the crystal oscillator over many years (e.g., 10 or greater) of operation is typically greater than what is required for high performance. Furthermore, it is possible that the coil eigen frequency will significantly drift over many years due to aging effects of the fiber coil itself.

For both navigation and high performance grade FOGs, a better method for controlling the bias modulation to the eigen frequency is to employ an eigen frequency detector and a servo control loop that automatically maintains the gyro operation at the eigen frequency. The eigen frequency detector provides an error signal that is null when the bias modulation is at the coil eigen frequency. The servo loop maintains the bias modulation at the coil eigen frequency by nulling the error signal from the eigen frequency detector.

Eigen frequency detection can be accomplished by a number of methods. One such method, described in U.S. Pat. No. 5,090,809, involves demodulating the quadrature of the rate signal to extract information about the eigen frequency. This method relies on imperfections of the phase modulator in the form of spurious intensity modulation to generate an eigen frequency error signal. A drawback to this approach is that the sensitivity of the eigen frequency error signal to changes in eigen frequency depends on imperfections of an optical component, which may or may not be at an acceptable level and may vary drastically from unit to unit. To overcome this drawback, this patent teaches that it may be desirable to increase the magnitude of the spurious intensity modulation by decreasing the length of the phase modulator or by adding an intensity modulator to the optical circuit. This method adds significant complexity to the optical circuit and introduces additional intensity modulation, which could generate other types of gyro errors. Another drawback to this approach is the detection process which involves demodulating the quadrature of the rate signal to extract the eigen frequency error signal. Since the demodulation process of a practical device cannot be made to be exactly in quadrature (90 degrees out of phase) of the rate signal, some crosstalk will occur between the rate and the eigen frequency error signal channels. This crosstalk will limit the performance of the eigen frequency servo. Furthermore, since the eigen frequency demodulator is operating at the same frequency as the rate demodulator, then the eigen frequency demodulator will be sensitive to any interference at the same frequency. This interference can be in the form of electrostatic or electromagnetic coupling, or signal currents causing spurious signals due to voltage drops on ground lines or power-supply lines. Signal interference can also limit the performance of this type of eigen frequency servo.

Another approach is describe in U.S. Pat. No. 5,734,469, which is an improvement over U.S. Pat. No. 5,090,809. This approach also involves demodulating the quadrature of the rate signal. However, the sensitivity of the eigen frequency error signal to changes in eigen frequency is determined and increased by implementing a square-wave bias modulation with a non 50—50 duty cycle. The advantage of this method is that changes in the optical components are not required to enhance the sensitivity of the eigen frequency error signal. However, this invention has the same disadvantages associated with quadrature detection that were mentioned in the previous paragraph for U.S. Pat. No. 5,090,809. Furthermore, laboratory tests performed have shown that this method, and thus any method involving quadrature detection, may not be accurate enough for the high performance applications.

Accordingly there remains a need to provide a scheme by which the eigen frequency of a fiber loop of a FOG can be easily and accurately detected so that FOGs with the desired stability and performance can operate over wide temperature ranges for long periods of time.

BRIEF SUMMARY OF THE INVENTION

This present invention proposes an improved method of detecting the eigen frequency, without the drawbacks associated with prior art methods. Specifically, employing the method according to the present invention does not require additional optical components, does not require imperfections in the phase modulator or the bias modulation, and does not involve quadrature demodulation. Furthermore, it has been demonstrated that this new method is capable of detecting 0.3 parts-per-billion changes in the frequency separation of eigen and the bias modulation frequencies. This level of performance is believed to be more than adequate for both navigation and high performance grade FOGs.

More specifically, the present invention involves the use of an additional phase modulation applied to the light waves propagating through the sensing coil. The additional phase modulation generates an "error" signal that is proportional to the frequency difference between the gyro operating frequency and the eigen frequency. A servo loop controls the gyro operating frequency to the eigen frequency by driving the "error" signal to a null.

In a preferred embodiment, the present invention comprises a fiber optic gyro (FOG) that, as is well known, includes a light source, a fiber coupler connected to the light source, an integrated optics chip (IOC) capable of modulating light received from the light source via the fiber coupler, a sensing coil in communication with the IOC, a bias modulation generator for imparting a bias modulation signal to the light, and a photodetector for receiving light returning from the sensing coil that is representative of a rotation rate of the sensing coil. In accordance with the principles of the present invention, the FOG also includes a second modulation generator for imparting a second modulation, preferably sinusoidal, signal to the light, a high-frequency demodulator in communication with a signal produced, at least indirectly, by the photodetector, and a low-frequency demodulator in communication with the high-frequency demodulator. In operation, the high-frequency demodulator receives the second, sinusoidal, modulation signal as a reference frequency and the low-frequency demodulator receives the bias modulation signal as a reference frequency, and an output of the low-frequency demodulator represents a magnitude and sign of a frequency difference between a frequency of the second modulation signal and an even-harmonic of the eigen frequency.

This information can then be used to maintain the operating frequency of the gyro at the eigen frequency of the sensing coil and thereby achieve improved performance.

The eigen frequency detector can also be used for other types of sensors that employ a Sagnac interferometer. For example, an eigen frequency servo can be used to improve the performance of a fiber optic current sensor employing a ring interferometer. Furthermore, other types of sensors could be constructed such that the eigen frequency of the coil is made sensitive to the desired measurand.

The features and attendant advantages thereof will be more fully understood upon a reading of the following detailed description in conjunction with the associated drawings.

DETAILED DESCRIPTION OF THE INVENTION

The present invention provides an improved method for detecting the coil eigen frequency during normal gyro operation. This improved method involves the use of an additional phase modulation applied to the light waves propagating through the sensing coil. The additional phase modulation generates an "error" signal that is proportional to the frequency difference between the gyro operating frequency and the eigen frequency. A servo loop controls the gyro operating frequency to the eigen frequency by driving the "error" signal to a null.

Figure 1:
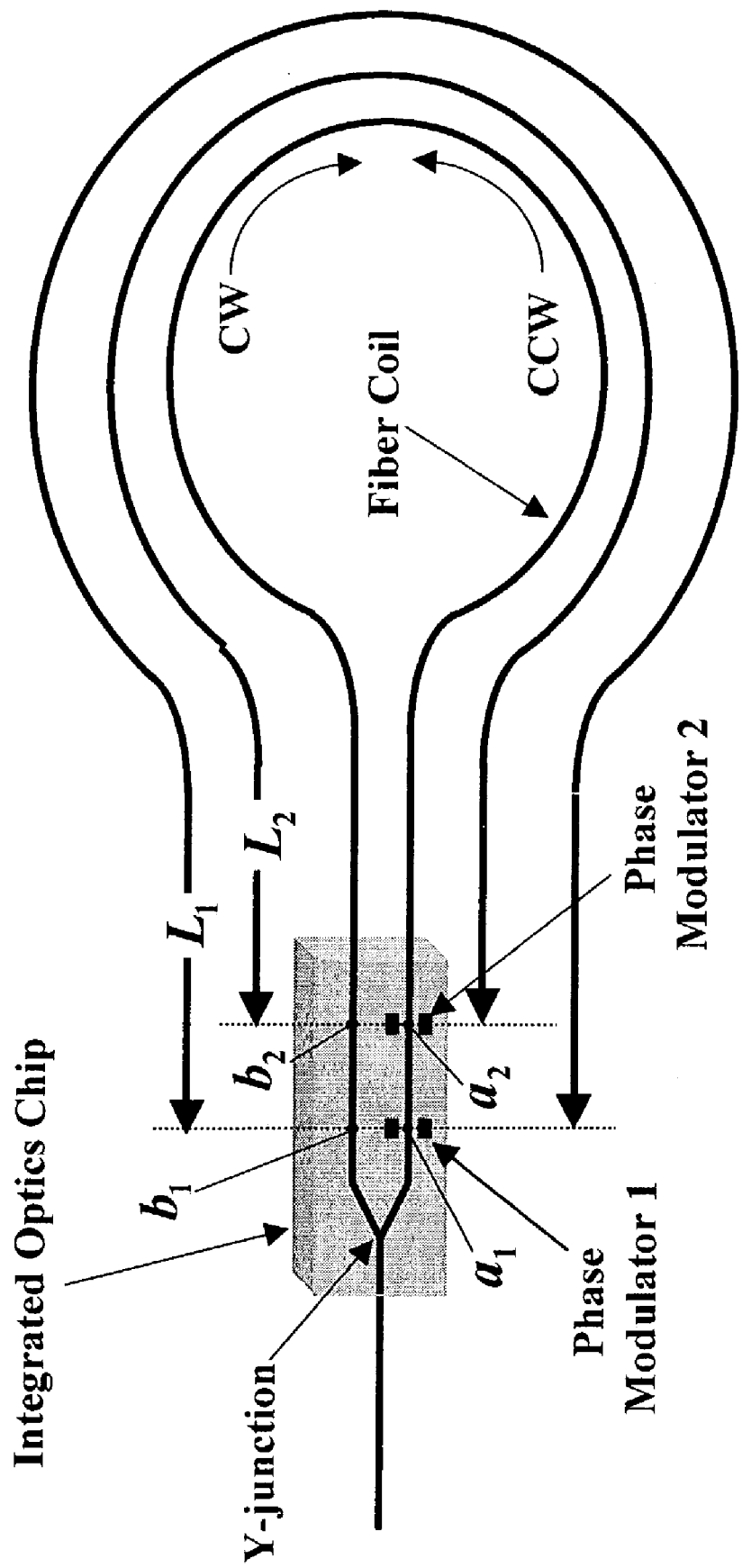
FIG. 1 shows a sensing coil with markings that help to illustrate the present invention.

FIG. 1 shows a diagram of a sensing coil and an integrated optics chip with phase modulators to help describe the concept of an eigen frequency associated with a phase modulator. The entire optical loop comprises the optical path from the y-junction, through the integrated optics chip, through the fiber coil, and returning back through the integrated optics chip and to the y-junction. If a phase modulation is applied at point $a_1$ within the optical loop, the modulated counter-clockwise (CCW) optical wave will have to travel from point $a_1$, through the fiber coil to point $b_1$, and then to the y-junction, whereas the modulated clockwise (CW) optical wave will only have to travel the short distance from point $a_1$ directly to the y-junction without travelling through the fiber coil. Therefore, the modulated CCW optical wave will experience a significant delay relative to the modulated CW optical wave. The relative time delay between the modulated CCW and CW optical waves is the time $\tau_1$ that it takes light to travel from point $a_1$, through the coil, to point $b_1$, where points $b_1$ and $a_1$ have the same optical distance from the y-junction. If the phase modulation is generated in a way that provides a phase shift between the modulation of the CCW and CW optical waves that is an integer multiple of 360 degrees, then the phase modulation on the CW wave will be exactly the same as the phase modulation on the CCW wave when the two waves interfere. Under this condition there will be no phase modulation difference between the counter-propagating optical wave and therefore no resulting intensity variation due to interference between the two waves. This condition occurs when the modulation frequency is set at an even integer of the eigen frequency $f_{e1}$, which is given by:

$$f_{e1}=1/(2^*\tau_1)=c/(2^*L_1) \tag{Eq. 1}$$

where $L_1$ is the optical path length from point $a_1$, through the fiber coil, to point $b_1$, and c is the speed of light in a vacuum. If a phase modulation is applied to point $a_2$ within the optical loop, then eigen frequency $f_{e2}$ associated with this phase modulator is given by:

$$f_{e2}=1/(2^*\tau_2)=c/(2^*L_2) \tag{Eq. 2}$$

where $\tau_2$ is the time for light to travel from point $a_2$, through the fiber coil, to point $b_2$, and $L_2$ is the optical path length from point $a_2$, through the fiber coil, to point $b_2$. The above description shows that the eigen frequency associated with a phase modulator depends on the phase modulator's location within the optical loop.

Figure 3:
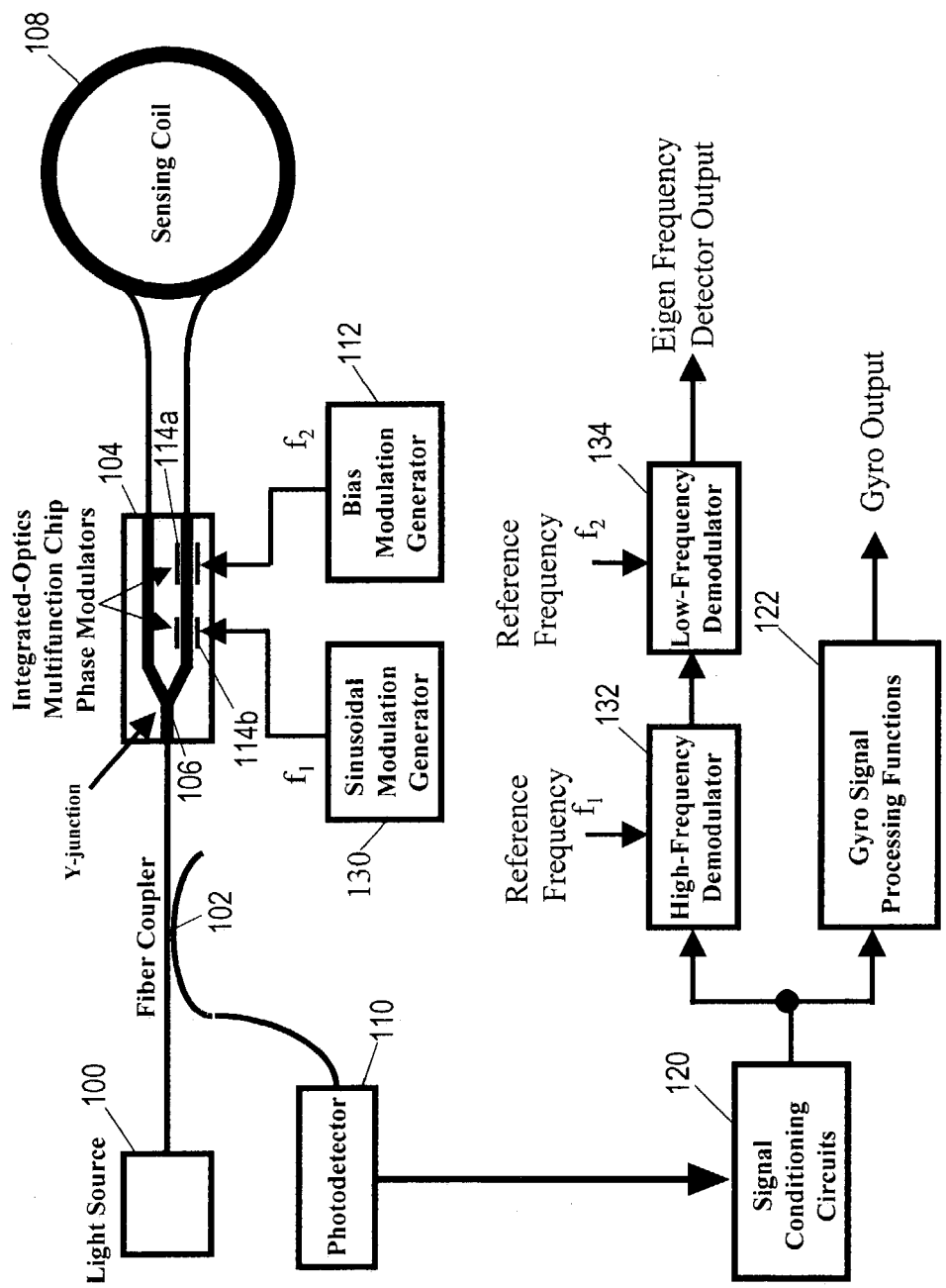
FIG. 3 is a functional diagram of an open loop interferometric fiber optic gyro incorporating an eigen frequency detector in accordance with the present invention.

FIG. 3 shows a functional diagram of a simple open loop IFOG employing the improved eigen frequency detector. An open loop IFOG is used here as an example for simplicity. However, the present invention will work equally well with a closed loop IFOG. Light from light source 100 passes through a fiber coupler 102 and to an integrated optics chip (IOC) 104 where it is split into two waves by a Y-junction 106. The two optical waves counter-propagate through sensing coil 108 and then are recombined at Y-junction 106. The recombined waves then propagate back to fiber coupler 102, which redirects a portion of the light to photodetector 110. The light intensity at photodetector 110 depends on the phase difference between the counter-propagating waves. A phase difference can be created by either rotation along the sensing axis of coil 108 or by applying a time-variant phase modulation to the counter-propagating waves.

A bias modulation is used to improve the sensitivity of the gyroscope to very low rotation rates. A bias modulation generator 112 applies a sinusoidal or square wave drive signal at frequency $f_2$ to one of the IOC phase modulators 114a. This generates a signal at frequency $f_2$ at photodetector 110 that is proportional to rotation rate. Photodetector 110 converts the optical signal to an electrical signal, which passes through signal conditioning circuits 120, which typically comprise amplifiers and filters. The rotation signal at frequency $f_2$ is then demodulated by gyro signal processing functions 122, which output a dc signal that is proportional to rate.

Figure 2:
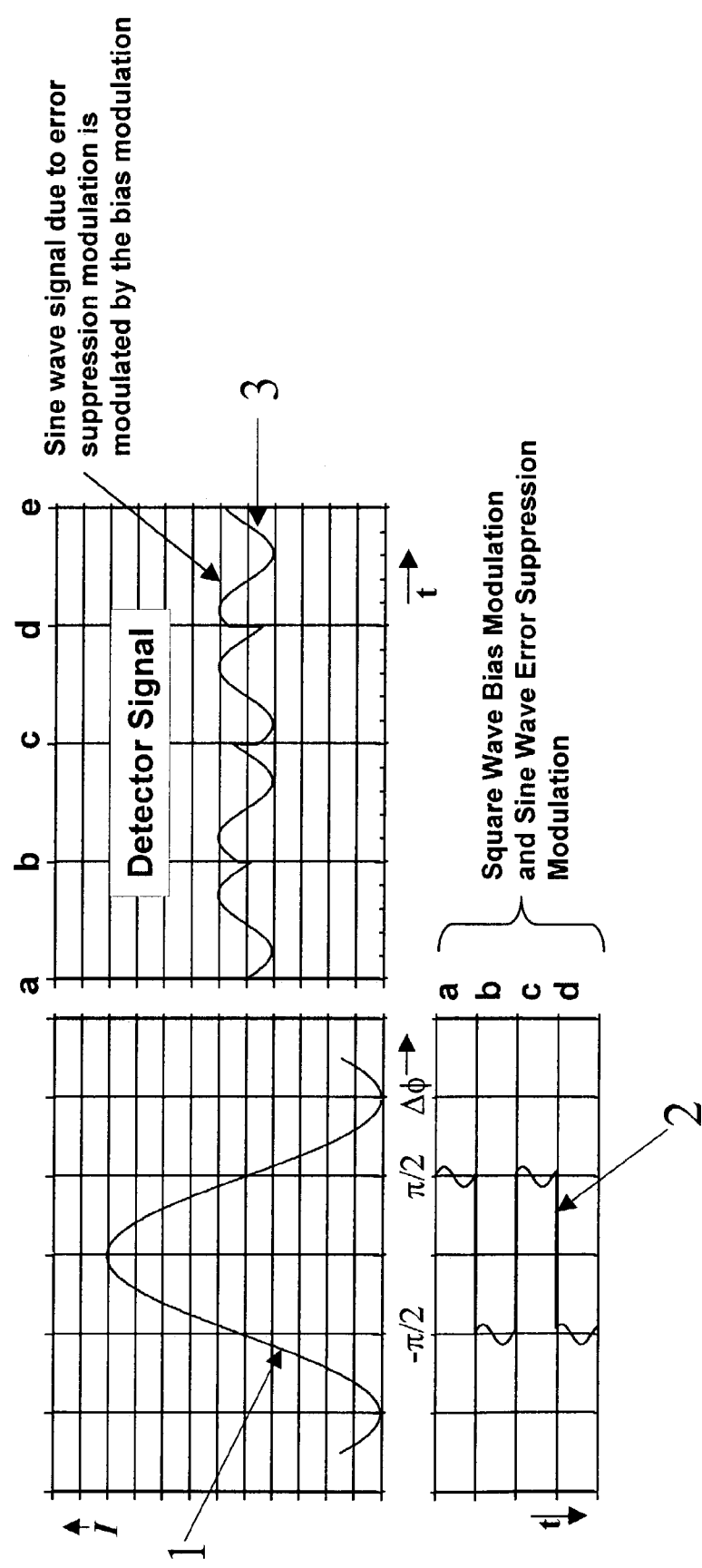
FIG. 2 illustrates how the eigen frequency error signal is generated under a particular condition in accordance with the present invention.

In accordance with the present invention, a sinusoidal modulation generator 130 produces a sinusoidal signal at frequency $f_1$ to drive another IOC phase modulator 114b. (Those skilled in the art will appreciate that the second phase modulator is not necessary for the present invention and thus the sinusoidal modulation generator 130 could be configured to drive phase modulator 114a. Furthermore, the present invention would still work if generator 130 is configured to produce non-sinusoidal signals such as a square wave, which may be done to simplify the design of the modulation generator 130). For an ideal case, if the frequency $f_1$ is set exactly to an even-harmonic of the eigen frequency $f_{e1}$, then no phase difference is generated at the modulation frequency $f_1$, and therefore the sinusoidal drive signal does not generate a signal at photodetector 110. However, if the sinusoidal drive frequency $f_1$ deviates from the even-harmonic of the coil eigen frequency $f_{e1}$, then there will be a resulting "error" signal at photodetector 110. FIG. 2 illustrates how the eigen frequency error signal is generated for a case where the sinusoidal signal frequency $f_1$ is not equal to an even integer of the eigen frequency $f_{e1}$, and is approximately but not exactly at twice the square-wave bias modulation frequency $f_2$. The raised cosine curve 1 illustrates the optical intensity at the photodetector as a function of the total phase difference $\Delta\phi$ between the counter-propagating optical waves that interfere at the photodetector. Curve 2 shows the net phase modulation as a function of time. The net phase modulation is a composite of the square-wave bias modulation and a sinusoidal modulation. The interferometer intensity output at the detector, curve 3, can be found by translating the points in curve 2 onto the curve 1. In this example the bias modulation is a square wave which is alternating between $\pi/2$ and $-\pi/2$ in phase, which is a typical amplitude for bias modulation in practice. When the bias modulation switches from $\pi/2$ and $-\pi/2$, the slope of curve 1 switches from negative to positive. Because of the alternating sign in the slope, the signal generated by the sinusoidal phase modulation at frequency $f_1$ is modulated by the bias modulation at $f_2$. Therefore, the error signal will occur as side-bands about the frequency $f_1$. The side-bands will be at frequencies $f_1+/-n*f_2$, where n is an integer.

To detect the eigen frequency, the photodetector signal is demodulated by two phase-sensitive demodulators. First, the photodector signal is demodulated at frequency $f_1$ by a high-frequency demodulator 132. The output of high-frequency demodulator 132 is then demodulated at frequency $f_2$ by a low frequency demodulator 134. The output of the "low-frequency" demodulator is the eigen frequency error signal, which represents the magnitude and sign of the frequency difference between the sinusoidal drive and the even-harmonic of the eigen frequency. The order of the two demodulators can be switched as long as the low-frequency demodulator is configured in a way that it will pass signals at the higher frequency $f_1$. Care must be taken when selecting the frequencies $f_1$ and $f_2$. Poor performance of the eigen frequency detector and the gyro rate output can occur if frequency $f_1$ is set to be an exact even integer of frequency $f_2$. The eigen frequency detector can be made immune to many sources of errors by setting the frequency $f_1$ that is slightly different than an exact even integer of frequency $f_2$. This relation is given by:

$$f_1 = (m*f_2) - \Delta f \qquad \text{(Eq. 3)}$$

where m is an even integer and $\Delta f$ is a relatively small frequency deviation. For FOGs employing integrated optics chips with one set of phase modulators for the bias modulations and another set of phase modulators at a different point in the optical loop for the sinusoidal modulation, the preferred method is to choose a frequency difference $\Delta f$ such that, when the sinusoidal modulation frequency $f_1$ is at an even integer of the eigen frequency $f_{e1}$, then the bias modulation frequency $f_2$ is at the eigen frequency $f_{e2}$. This way, gyro rate errors associated with operation off the eigen frequency will be eliminated or minimized when the eigen frequency error signal is zero. The frequency $\Delta f$ is determined by the optical path length between sinusoidal and bias phase modulators and the even harmonic number m that is chosen. The sensitivity of the eigen frequency detector is proportional to the even harmonic number m. Therefore, the sensitivity of the eigen frequency detector can be increased without increasing the amplitude of the sinusoidal modulation by choosing a larger m, as long as the gyro electronics can pass, with little attenuation, an error signal at frequencies about $f_1$. Having the ability to increase the sensitivity by many factors is a major advantage that the present invention has over prior art. For a typical high performance FOG having a coil of 4 km of fiber, m is about 64 and $\Delta f$ is about 24 Hz.

Another major advantage the present invention has over prior art is the asynchronous double demodulation process. By choosing frequencies $f_1$ and $f_2$ that satisfy Equation 3 with $\Delta f$ not zero, the double demodulation process is made immune to many sources of errors. One example is an error caused by signal interference. The first demodulator will reject any signals that are not occurring at odd integers of the frequency $f_1$ and the second demodulator will reject any signals that are not occurring at odd integers of frequency $f_2$. The combined demodulators will only pass signals having the frequencies $f_1+/-n*f_2$, where n is an integer. Most sources of signal interference will not be at frequencies $f_1+/-n*f_2$ because a non-linear process is required to mix signals at harmonics of $f_1$ with signals at harmonics of $f_2$.

Two separate phase modulators are not required for implementing the present invention. Having two sets of phase modulators that are in different points of the optical loop requires a relatively long integrated optics chip. Some applications require FOGs to be a small as possible. These smaller FOGs do not have enough room within its package to accommodate the relatively long integrated optics chips with two sets of separated phase modulators and thus have integrated optics chips with only one set of phase modulators. For this type of FOG, the sinusoidal modulation is applied to the same phase modulator as the bias modulation. It is still important to maintain the same frequency relation shown in Equation 3 with $\Delta f$ not equal to zero. For this case, the eigen frequency detector output will still be zero when the sinusoidal modulation frequency $f_1$ is at an even integer of the eigen frequency $f_{e2}$. However, the bias modulation frequency will no longer be exactly at the eigen frequency $f_{e2}$. Rate errors associated with operating away from the eigen frequency can be minimized by choosing a frequency difference Δf that is relatively small, but not zero. An example is a FOG with a 1 km coil. The eigen frequency in this case would be about 100 kHz. If m is chosen to be 64 and Δf is chosen to be 16 Hz, then the bias modulation frequency will be only 2.5 ppm away from the eigen frequency, which is more than adequate for most applications involving a smaller FOG.

For a non-ideal case, there may be some error mechanism that will cause the eigen frequency detector to have a zero output value when the sinusoidal frequency $f_1$ is not exactly at an even integer of the eigen frequency. For the case where a servo loop is maintaining the output of the eigen frequency detector at zero, the sinusoidal modulation will produce an unwanted residual signal at photodetector 110. The main loop signal processing which detects the rotation rate signal can be sensitive to the residual signal, thus resulting in false indication of rotation rate at a frequency of Δf. For many applications this is not a problem if the frequency Δf is high enough. However, there may be some gyro applications that cannot tolerate a sinusoidal rate error at frequency Δf. Fortunately there is a way to eliminate this effect.

One way to employ the additional modulation without generating a false indication of rotation rate is described in U.S. Pat. No. 5,781,300, which is incorporated herein by reference. The scheme described in U.S. Pat. No. 5,781,300 involves adding sinusoidal modulation for reducing bias errors due to backscatter. This scheme has since been found, however, to be an excellent way of detecting the eigen frequency in accordance with the present invention. More specifically, it has been determined that if the sinusoidal modulation frequency is set to an even harmonic of the eigen frequency that satisfies a special condition, then the main gyro signal processing will be insensitive to the residual signal. The special condition is determined by how the main gyro signal processing is done. Most FOGs employing square wave bias modulation often include unwanted glitches in the optical signal whenever the bias modulation makes a transition from one level to the other. Rate errors will occur if these glitches are allowed to pass through the gyro signal processing. The effects of the glitches can be greatly reduced by gating out the portion of the signal where the glitch has a significant amplitude. This is typically done by not processing the A/D samples that correspond to when the glitch has significant amplitude. The process of gating out samples during the glitch makes the demodulation process of the rate signal sensitive to spurious signals at some even integers of the bias modulation frequency. If the spurious signal is at a frequency such that there are not integer number of cycles of the spurious signal that occur within the gate period, then a rate error will result from the spurious signal. However, if the spurious signal is at a frequency such that there are integer number of cycles of the spurious signal that occur within the gate period, then a rate error will not occur. The special condition for the sinusoidal phase modulation is to pick an integer m, such that an integer number of sinusoidal phase modulation cycles fit within the gate period when Δf is zero. As long as Δf is kept small enough, this rate error due to the small deviation from this special condition will still be insignificant.

Figure 4:
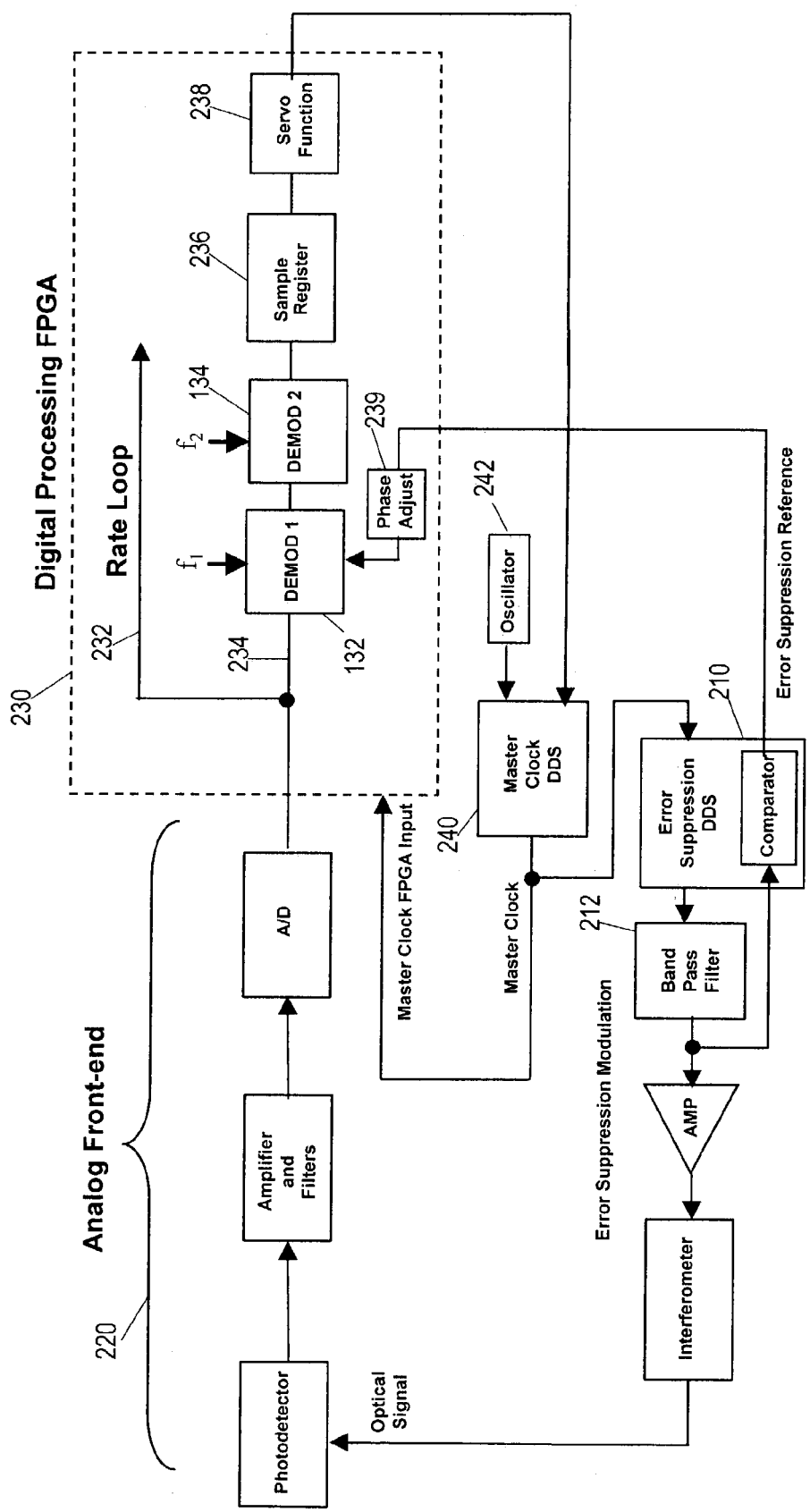
FIG. 4 is a functional diagram of a closed loop fiber optic gyro incorporating an eigen frequency detector in accordance with the present invention.

FIG. 4 shows a functional diagram of a closed-loop FOG employing the improved eigen frequency detector in a servo loop that controls the operational frequencies of the gyro. For this configuration the sinusoidal modulation is the same modulation (error suppression modulation) that is used for suppressing various types of gyro errors. A direct digital synthesizer (DDS) circuit 210 generates the error suppression modulation. A band-pass filter 212 is used to remove spurious signals from the error suppression modulation.

State-of-the art FOGs employ digital signal processing. As is well-known, the photodetector signal is amplified, filtered and digitized by analog front-end electronics 220. The digital signal processing is typically done in a field programmable gate array (FPGA) 230. FIG. 4 shows the digital signal being split into two paths 232, 234, one for the rate loop processing and the other for the eigen frequency detector.

A master clock DDS circuit 240 derives the master clock frequency from a crystal oscillator 242. The master clock frequency is used to clock the logic functions in FPGA 230. The bias modulation frequency is generated by FPGA 230 and is derived from the master clock frequency.

As explained with reference to FIG. 3, the digital eigen frequency detector of the present invention preferably comprises two digital demodulators 132, 134 and, in addition, a sample register 236. First demodulator 132 demodulates at frequency $f_1$ and second demodulator 134 demodulates at frequency $f_2$. The output of sample register 236 is the output of the eigen frequency detector. In closed loop operation, a servo function 238 maintains the error suppression frequency at the even harmonic of the coil eigen frequency $f_{e1}$ by adjusting the frequency of master clock 240. This servo loop automatically maintains the bias modulation frequency at the coil eigen frequency $f_{e2}$ since both the error suppression and the bias modulation frequencies are derived from the master clock frequency.

Figure 5:
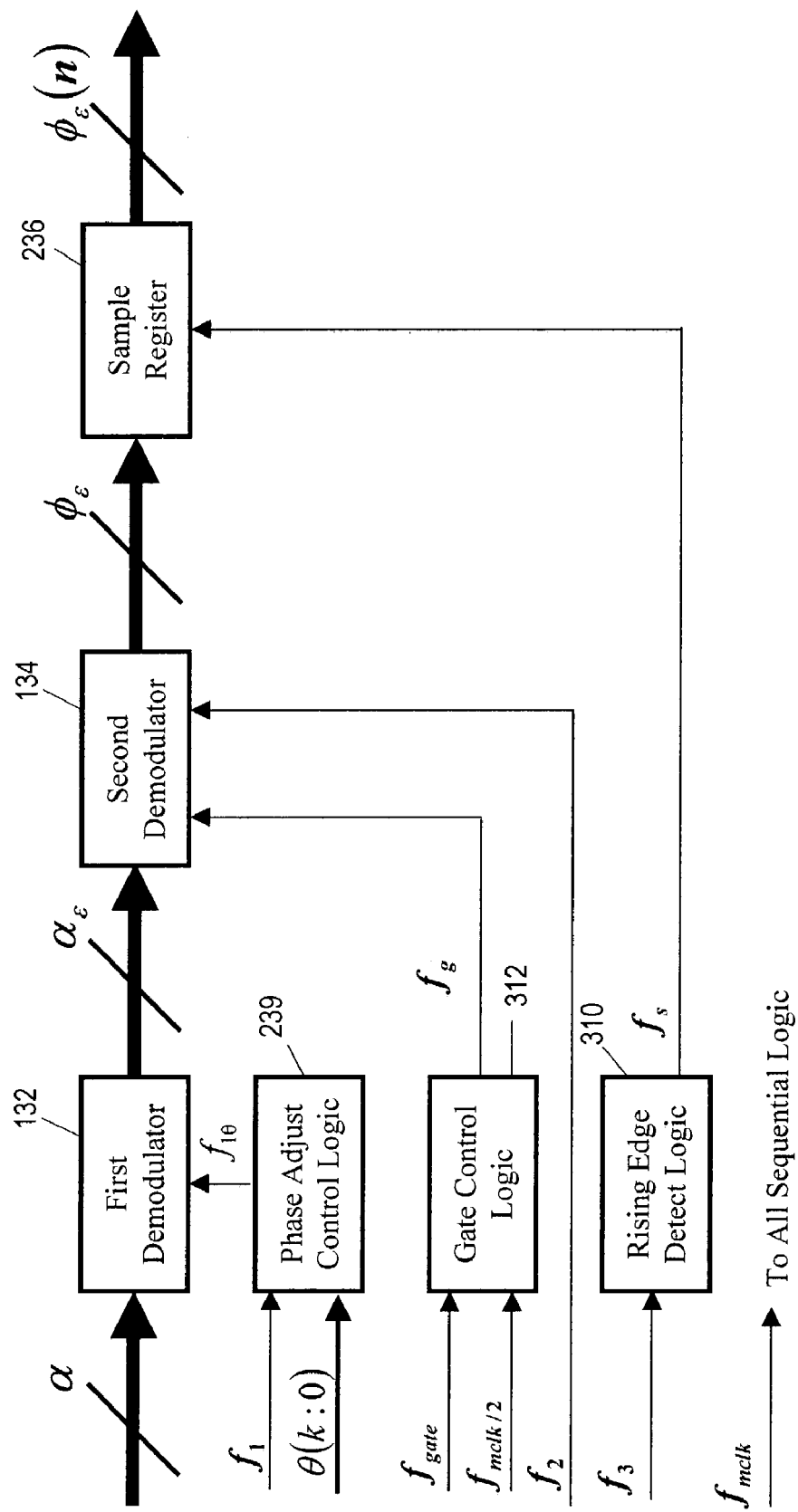
FIG. 5 shows a block diagram of a digital implementation of the eigen frequency detector in accordance with the present invention.

FIG. 5 shows a block diagram of a digital implementation of the eigen frequency detector in accordance with the present invention. This design uses continuous asynchronous double demodulation. The eigen-frequency detector logic uses the rising edge of a master clock frequency, $f_{mclk}$, input as the synchronous clock input by which all registers are clocked. The $f_{mclk/2}$ input is synchronous to the $f_{mclk}$ signal and is equal to $f_{mclk}/2$.

The clocks $f_1$ and $f_2$ are preferably asynchronous fifty percent duty cycle square wave inputs, where $f_1$ is equal to m times $f_2$ minus a small frequency difference and m is an integer. The clock $f_1$ is received and sent to phase adjust control logic 239 to produce the phase adjusted $f_1$ signal, $f_{1\theta}$. Phase adjust control logic 239 provides for a programmable phase adjustment of the $f_1$ input in increments $360/2^k$ degrees, where k is an integer, using the θ(k:0) bus input producing $f_{1\theta}$.

First demodulator 132 sums α over the positive half of the phase adjusted $f_{1\theta}$ signal, and subtracts the α over the negative half of $f_{1\theta}$ producing $\alpha_\epsilon$. Coincident with the rising edge of $f_{1\theta}$, the content of first demodulator 132, $\alpha_\epsilon$, is transferred to second demodulator 134 and is then subsequently reset to zero. Second demodulator 134 sums $\alpha_\epsilon$ over the positive half of $f_2$ and subtracts $\alpha_\epsilon$ over the negative half of $f_2$ producing $\phi_\epsilon$. This operation runs continuously.

The sample signal, $f_s$, is generated from rising edge detection logic 310. Rising edge detection logic 310 receives a positive pulse, $f_3$, with a period greater than $1/f_{mclk}$ producing an active high sample signal, $f_s$, having a pulse width period of $1/f_{mclk}$. Coincident with the falling edge of $f_s$, the contents of second demodulator 134, $\phi_\epsilon$, is transferred to sampling register 236 producing $\phi_\epsilon$ (n), where n is an integer. Simultaneously to the transfer, second demodulator 134 is subsequently reset to zero. This operation runs continuously.

Gating control logic 312 provides for an omission of demodulation transfers from first demodulator 132 to second demodulator 134. A logic high gate signal, $f_{gate}$, input with a period greater than $f_{mclk/2}$ generates $f_g$, causing an omission of modulation cycle transfers from first demodulator 132 to second demodulator 134 for a period of $f_{gate}$ plus four times the $f_{mclk/2}$ time period.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for detecting the eigen frequency of a sensing coil in a fiber optic gyro (FOG), the FOG comprising a light source, a fiber coupler connected to the light source, an integrated optics chip (IOC) capable of modulating light received from the light source via the fiber coupler, a sensing coil in communication with the IOC, a first modulation generator for imparting a first modulation signal to the light, and a photodetector for receiving light returning from the sensing coil that is representative of a rotation rate of the sensing coil, the system comprising:
    a second modulation generator for imparting a second modulation signal to the light;
    a high-frequency demodulator in communication with a signal produced, at least indirectly, by the photodector; and
    a low-frequency demodulator in communication with the high-frequency demodulator,
    wherein the high-frequency demodulator receives the second modulation signal as a reference frequency and the low-frequency demodulator receives the first modulation signal as a reference frequency, and
    wherein an output of the low-frequency demodulator represents a magnitude and sign of a frequency difference between a frequency of the second modulation signal and an even-harmonic of the eigen frequency of the sensing coil.

2. The system of claim 1, wherein the first modulation generator generates a bias modulation signal.

3. The system of claim 1, wherein the second modulation generator generates a sinusoidal signal.

4. The system of claim 1, further comprising a signal conditioning circuit disposed between the photodetector and the high-frequency demodulator.

5. The system of claim 1, wherein the second modulation generator is in communication with the IOC.

6. The system of claim 1, wherein the second modulation signal has a frequency that is an even harmonic of the sensing coil eigen frequency.

7. The system of claim 1, wherein the eigen frequency detector is implemented in a field programmable gate array.

8. The system of claim 1, wherein the eigen frequency detector is employed in a servo loop that controls an operational frequency of the gyro.

9. The system of claim 8, wherein the servo loop controls a master clock of electronics supporting the gyro.

10. An eigen frequency detector for a fiber optic gyro, comprising:
    means for applying a first drive signal at a first frequency to light being passed to a sensing coil of a fiber optic gyro (FOG);
    means for applying a second drive signal at a second frequency to the light being passed to the sensing coil of the FOG;
    means for detecting light returning from the sensing coil and producing an electrical signal representative of the detected light;
    means for demodulating the electrical signal using the second frequency as a reference frequency;
    means for further demodulating the electrical signal using the first frequency as a reference frequency; and
    means for monitoring a result of the further demodulating step, which provides a signal representative of a magnitude and sign of a frequency difference between a frequency of the second modulation signal and an even-harmonic of the eigen frequency of the sensing coil.

11. The system of claim 10, further comprising a servo function for controlling the operating frequency of the FOG in response to the result.

12. The system of claim 10, wherein the servo function controls a master clock.

13. The system of claim 10, wherein the second drive signal is a sinusoidal signal.

14. The system of claim 10, further comprising a sample register for storing samples of the result.

15. A method for detecting the eigen frequency of a sensing coil of a fiber optic gyro, comprising:
    applying a first drive signal at a first frequency to light being passed to a sensing coil of a fiber optic gyro (FOG);
    applying a second drive signal at a second frequency to the light being passed to the sensing coil of the FOG;
    detecting light returning from the sensing coil and producing an electrical signal representative of the detected light;
    demodulating the electrical signal using the second frequency as a reference frequency;
    further demodulating the electrical signal using the first frequency as a reference frequency;
    and monitoring a result of the further demodulating step, which provides a signal representative of a magnitude and sign of a frequency difference between a frequency of the second modulation signal and an even-harmonic of the eigen frequency of the sensing coil.

16. The method of claim 15, further comprising applying a servo function for controlling the operating frequency of the FOG in response to the result.

17. The method of claim 16, further comprising controlling a master clock with an output of the servo function.

18. The method of claim 15, wherein the second drive signal is a sinusoidal signal.

19. The method of claim 15, further comprising employing a sample register for storing samples of the result.

* * * * *